United States Patent
Kopylovitz

(10) Patent No.: US 8,839,026 B2
(45) Date of Patent: Sep. 16, 2014

(54) AUTOMATIC DISK POWER-CYCLE

(75) Inventor: Haim Kopylovitz, Herzliya (IL)

(73) Assignee: Infinidat Ltd., Herzliya (IL)

( * ) Notice: Subject to any disclaimer, the term of this patent is extended or adjusted under 35 U.S.C. 154(b) by 277 days.

(21) Appl. No.: 13/251,520

(22) Filed: Oct. 3, 2011

(65) Prior Publication Data

US 2013/0086416 A1    Apr. 4, 2013

(51) Int. Cl.
*G06F 11/00* (2006.01)
*G06F 11/07* (2006.01)

(52) U.S. Cl.
CPC ......... *G06F 11/0793* (2013.01); *G06F 11/008* (2013.01); *G06F 11/0727* (2013.01)
USPC ................. 714/6.2; 714/6.1; 714/2

(58) Field of Classification Search
CPC ............................ G06F 11/008; G06F 11/0727
USPC ...................... 714/6.2, 6.1, 6.22, 2
See application file for complete search history.

(56) References Cited

U.S. PATENT DOCUMENTS

| | | | |
|---|---|---|---|
| 7,886,182 B1* | 2/2011 | Coatney et al. | 714/3 |
| 2009/0172273 A1* | 7/2009 | Piszczek et al. | 711/114 |
| 2010/0185883 A1* | 7/2010 | Hamilton | 713/320 |

OTHER PUBLICATIONS

Knight, "Information technology-SCSI Enclosure Services-3 (SES-3)", Working Draft American National Standard, Jul. 22, 2009, 119 pages.
Co-pending U.S. Appl. No. 13/173,941, filed Jun. 30, 2011.

* cited by examiner

*Primary Examiner* — Sarai Butler
(74) *Attorney, Agent, or Firm* — Oren Reches

(57) ABSTRACT

According to the presently disclosed subject matter there is provided, inter alia, a system and method which enable to identify, in a storage-system, malfunctioning disks, and in response, to activate a power-cycle process only for the specific failing disks, in order to bring these disks into proper operational mode. During the power-cycle process of a failing disk, other disks, which are not failing, remain operative and available.

32 Claims, 5 Drawing Sheets

| Byte/Bit | 7 | 6 | 5 | 4 | 3 | 2 | 1 | 0 |
|---|---|---|---|---|---|---|---|---|
| 0 | Command control | | | | | | | |
| 1 | Reserved | | | | | | | |
| 2 | RQST ACTIVE | Do not remove | reserved | RQST missing | RQST insert | RQST remove | RQST ident | reserved |
| 3 | reserved | | RQST Fault | DEVICE OFF | Enable BYP A | Enable BYP B | reserved | |

Fig. 5

AUTOMATIC DISK POWER-CYCLE

FIELD OF THE PRESENTLY DISCLOSED SUBJECT MATTER

This invention relates to the field of data storage system management and maintenance.

BACKGROUND

In modern storage systems which comprise multiple disks, disk failure is a common scenario. Disk failure can result from a variety of reasons such as damaged media, protocol failure, internal software errors, mechanical problems, etc. Modern storage systems are adapted to address disk failure situations and the resulting data corruption by different approaches such as implementing data protection schemes (e.g. RAID 5 and RAID 6), self-healing mechanisms, data redistribution, proactive diagnosis procedures such as SMART and more. However, in many cases, disk failure results from a persistent cause which, if left untreated, continues to cause the disk to fail.

In some cases a disk can be fixed simply by "power-cycling" the failing disk, which restores the disk to proper operating mode once the disk, after its power is cut off, is turned on again. For this reason, in case of disk failure, it can be sometimes beneficial to attempt to fix a failing disk by operating a disk power-cycle rather than invoking other data recovery mechanisms, which consume more resources and do not eliminate the actual cause of the disk failure.

The Symmetrix 2.5 (developed by EMC$^2$® corporation) which was implemented with parallel Small Computer System Interface (SCSI) communication protocol, featured a host bus adapter (HBA) with reset and power-cycle capabilities, which enabled to reset and/or power-cycle an HBA along with all the disks which were connected to the HBA. In the Symmetrix 2.5 system a single HBA is connected to 4 disks. Thus, in case a single disk fails, all 4 disks which are connected to the HBA are reset, and all 4 disks are unavailable during the reset process.

In a power-cycle process a disk is cut off from its power source (i.e. turned off) and then reconnected to the power source (i.e. turned on). In a reset process the disk remains connected to the power source while some of its systems are reinitialized. For example, in a reset process, non-volatile memory associated with the disk can be flushed. However, in case disk failure is caused by software failure, it is likely that a reset command would fail as well, and therefore, in such cases reset is inadequate.

Furthermore, unlike the Symmetrix 2.5 system, in some modern storage systems a single HBA can be connected to tens and sometimes hundreds of disks. Therefore power-cycling the HBA, or otherwise power-cycling all disks connected to a single HBA, is very inefficient in such storage systems where a single failing disk would cause a large number of disks to become unavailable (even if temporarily).

Today a common approach to addressing this problem is by power-cycling the disk manually, for example by disconnecting a malfunctioning disk from its respective bay in the enclosure, and then reconnecting the disk.

SUMMARY

According to one aspect of the presently disclosed subject matter there is provided a method of automatic disk power-cycle, for use in a storage system comprising one or more disk enclosures comprising a plurality of disks located in respective disk slots in the enclosures, the enclosures being adapted to be controlled by enclosure control commands, the method comprising: responsive to identifying a malfunctioning disk, wherein the malfunctioning is likely to be repaired by a disk power-cycle, generating data indicative that the malfunctioning disk is temporarily unavailable; sending to a disk enclosure, containing a disk slot corresponding to the malfunctioning disk, a first device slot control element directed to turn off the disk slot, thereby turning off the corresponding disk; sending to the disk enclosure, a second device slot control element directed to turn on the disk slot, thereby turning the corresponding disk back on; generating data indicative that the malfunctioning disk is available.

According to certain embodiments of the presently disclosed subject matter the method further comprising: receiving disk fault information in respect of at least one malfunctioning disk; analyzing the disk fault information and estimating whether the disk is likely to be repaired by a disk power-cycle.

According to certain embodiments of the presently disclosed subject matter the method further comprising delaying the sending of the second device slot control element, for a predefined period of time from the time of sending the first device slot control element.

According to another aspect of the presently disclosed subject matter there is provided a storage system comprising one or more disk enclosures controlled by a plurality of storage control devices, the storage control devices constituting a storage control layer, the storage control layer operatively coupled to the one or more disk enclosures, the one or more disk enclosures comprising a plurality of disks located in respective disk slots in the enclosures; the enclosures being adapted to be controlled by the control layer in accordance with enclosure control commands; the control unit is configured, responsive to identifying a malfunctioning disk, wherein the malfunctioning is likely to be repaired by a disk power-cycle, to generate data indicative that the malfunctioning disk is temporarily unavailable; send to a disk storage device containing a disk slot corresponding to the malfunctioning disk, a first device slot control element directed to turn off the disk slot, thereby turning off the corresponding disk; send to the disk enclosure a second device slot control element directed to turn on the disk slot, thereby turning the corresponding disk back on; and generate data indicative that the malfunctioning disk is available.

According to certain embodiments of the presently disclosed subject matter the control layer is further configured to analyze disk fault information being indicative of at least one malfunctioning disk and estimate whether the disk is likely to be repaired by a disk power-cycle.

According to certain embodiments of the presently disclosed subject matter the control layer is further configured to delay the sending of the second device slot control element, for a predefined period of time, from the time of sending the first device slot control element.

According to another aspect of the presently disclosed subject matter there is provided a disk performance monitor, operatively connectible to a storage system comprising one or more disk enclosures controlled by a plurality of storage control devices, the storage control devices constituting a storage control layer, the storage control layer operatively coupled to the one or more disk enclosures; the one or more disk enclosures comprising a plurality of disks located in respective disk slots in the enclosures; the enclosures being adapted to be controlled by the control layer in accordance with enclosure control commands; the control unit is configured, responsive to identifying a malfunctioning disk, wherein the malfunctioning is likely to be repaired by a disk power-cycle, to generate data indicative that the malfunctioning disk is temporarily unavailable;

send to a disk storage device containing a first disk slot corresponding to the malfunctioning disk, a device slot control element directed to turn off the disk slot, thereby turning off the corresponding disk; send to the disk enclosure, a second device slot control element directed to turn on the disk slot, thereby turning the corresponding disk back on; and generate data indicative that the malfunctioning disk is available.

According to yet another aspect of the presently disclosed subject matter there is provided a program storage device readable by machine, tangibly embodying a program of instructions executable by the machine to perform method steps of a method of automatic disk power-cycle, for use in a storage system comprising a one or more disk enclosures comprising a plurality of disks located in respective disk slots in the enclosures, the enclosures being adapted to be controlled in accordance with enclosure control commands, the method comprising:

responsive to identifying a malfunctioning disk, wherein the malfunctioning is likely to be repaired by a disk power-cycle, generating data indicative that the malfunctioning disk is temporarily unavailable;

sending to a disk enclosure containing a first disk slot corresponding to the malfunctioning disk, a device slot control element directed to turn off the disk slot, thereby turning off the corresponding disk;

sending to the disk enclosure, a second device slot control element directed to turn on the disk slot, thereby turning the corresponding disk back on;

generating data indicative that the malfunctioning disk is available.

According to certain embodiments of the presently disclosed subject matter the storage system is configured to operate in accordance with a Serial Attached SCSI (SAS) and SAS Enclosure Service (SES).

According to certain embodiments of the presently disclosed subject matter the device slot control element contains a DEVICE OFF bit set to 1 in order to turn off the disk and wherein the device slot control element contains a DEVICE OFF bit set to 0 in order to turn on the disk.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIG. 5 is a schematic illustration of a device slot control element.

DETAILED DESCRIPTION

Figure 1:
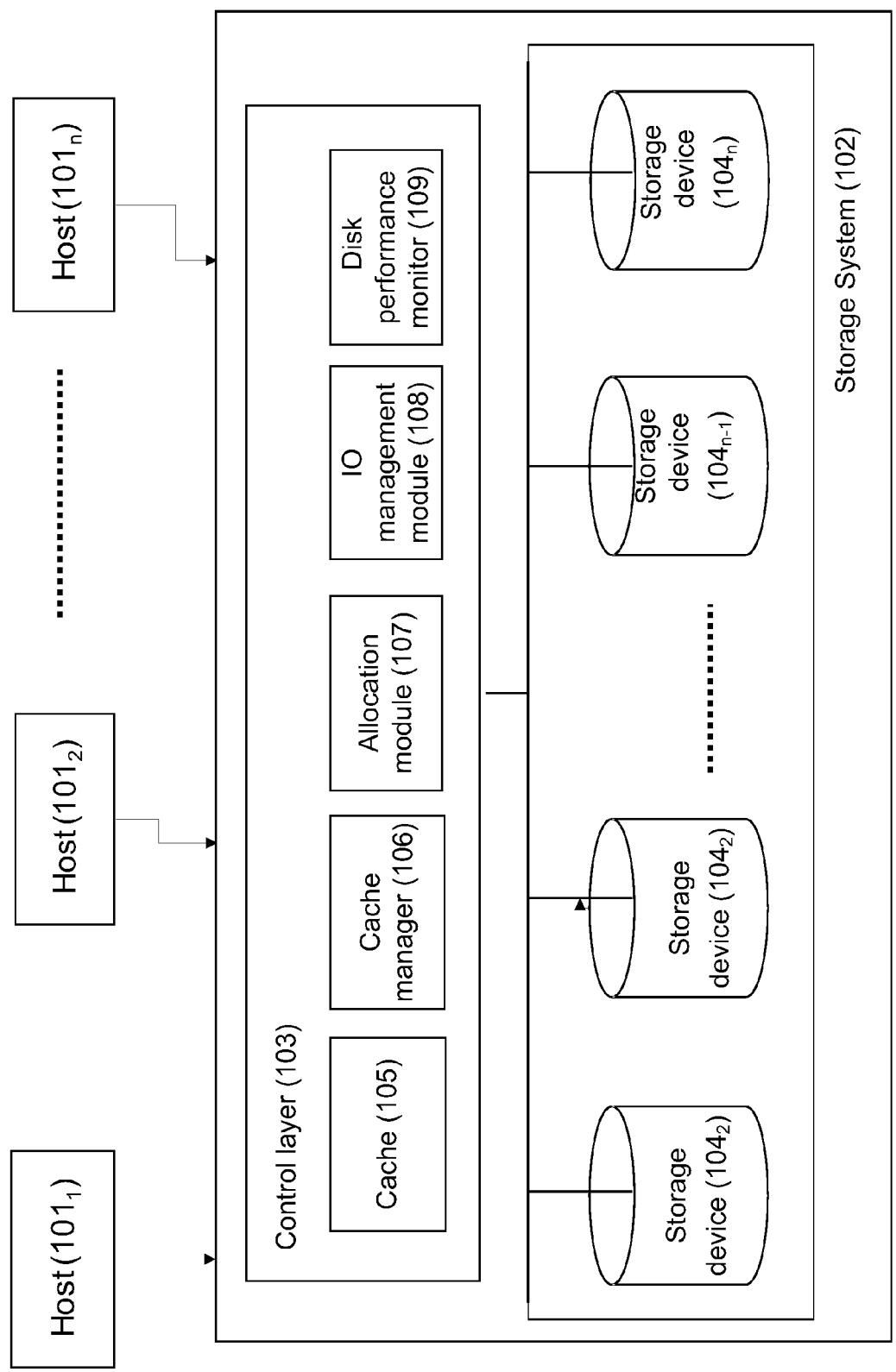
FIG. 1 is a functional block diagram schematically illustrating storage-system architecture, according to the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "receiving", "generating", "analyzing", "updating", "sending", "validating", "checking", "determining, "obtaining", "writing", "calculating" or the like, include action and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
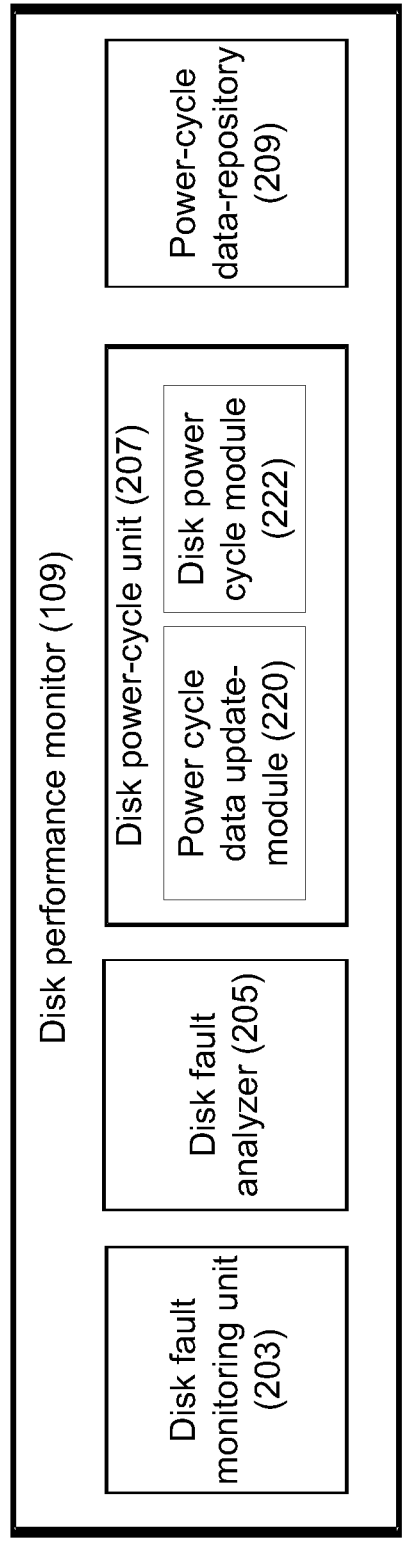
FIG. 2 is a functional block diagram schematically illustrating an example of disk performance monitor, according to the presently disclosed subject matter.
Figure 3:
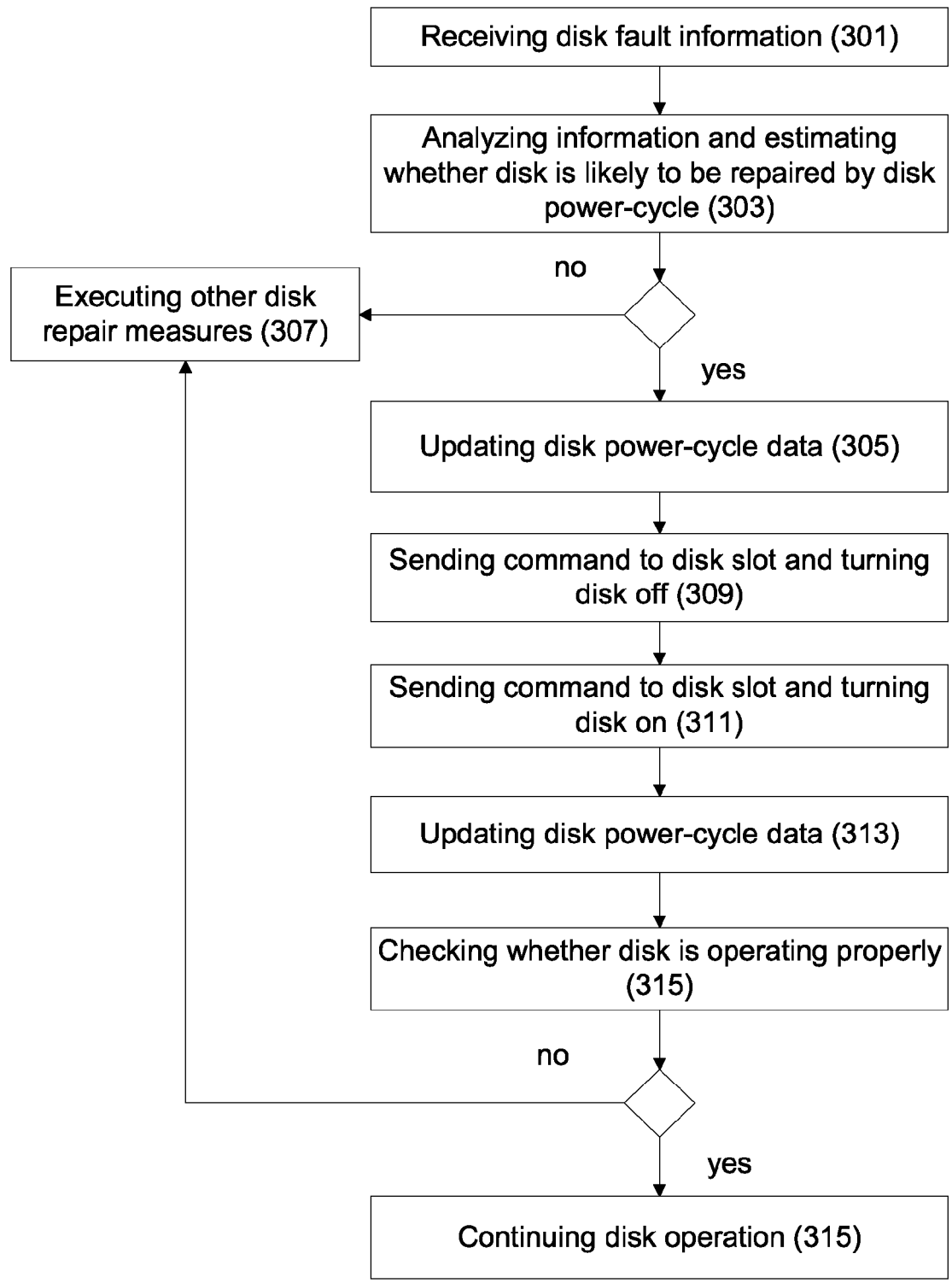
FIG. 3 is a flowchart showing an example of operations carried out, in accordance with the presently disclosed subject matter.
Figure 4:
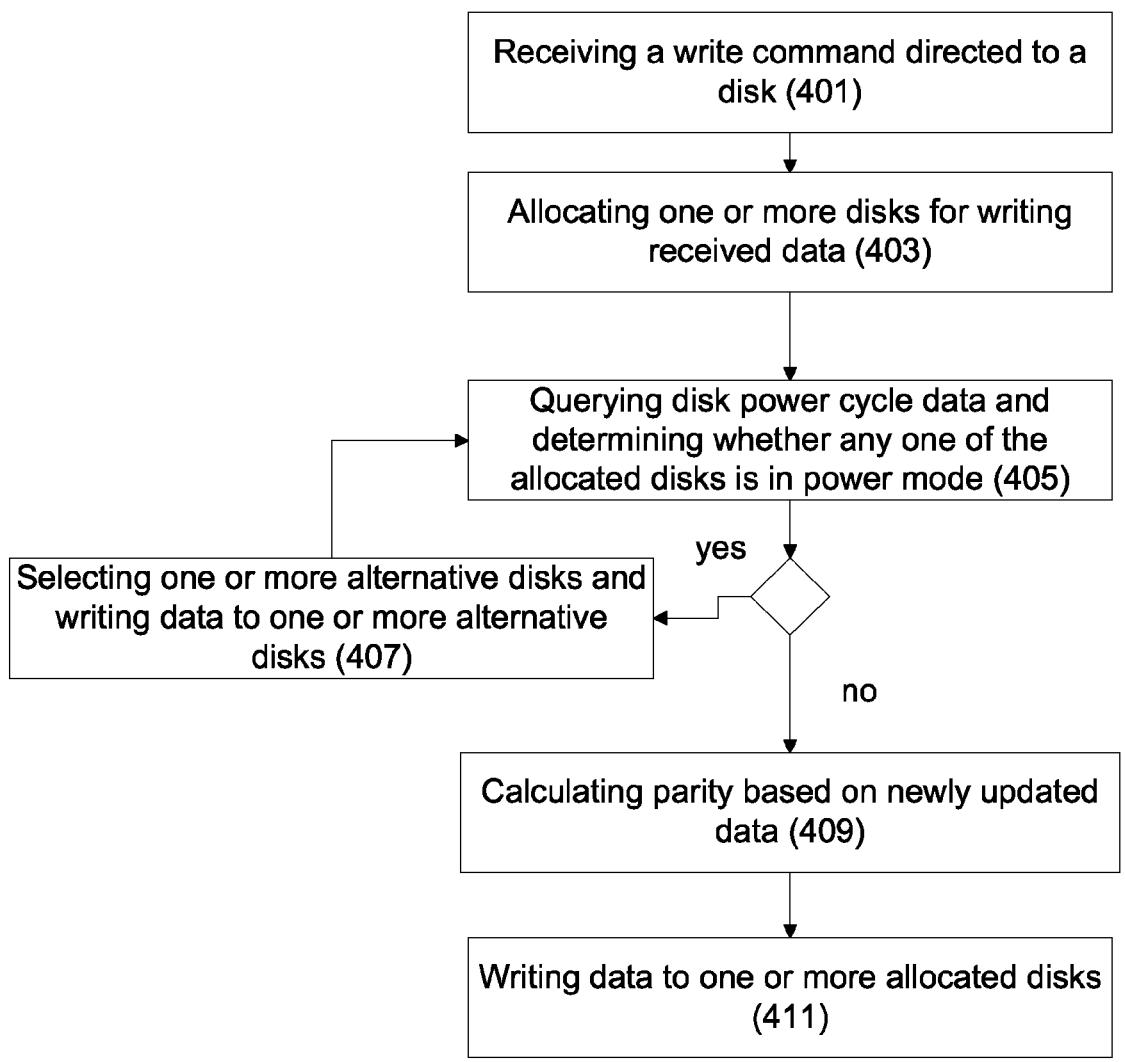
FIG. 4 is a flowchart showing an example of operations carried out, in accordance with the presently disclosed subject matter.

In embodiments of the presently disclosed subject matter, fewer, more and/or different stages than those shown in FIG. 3 and FIG. 4 may be executed. In embodiments of the presently disclosed subject matter one or more stages illustrated in FIG. 3 and FIG. 4 may be executed in a different order and/or one or more groups of stages may be executed simultaneously. FIG. 1 and FIG. 2 illustrate a general schematic of the system architecture in accordance with an embodiment of the presently disclosed subject matter. Each module in FIG. 1 and FIG. 2 can be made up of any combination of software, hardware and/or firmware that performs the functions as defined and explained herein. The modules in FIG. 1 and FIG. 2 may be centralized in one location or dispersed over more than one location. In other embodiments of the presently disclosed subject matter, the system may comprise fewer, more, and/or different modules than those shown in FIG. 1 and FIG. 2.

As explained above a failing disk can be sometimes repaired by power-cycling the failing disk. For example, in case disk failure is caused by software failure (e.g. protocol failure), this operation is in many cases sufficient to restore the disk into proper operational mode.

As further explained above, the prior art suggests, in case of a failing disk, to power-cycle the disk. Power-cycle involves disconnecting the power to the disk and is therefore (unlike disk reset) adequate for overcoming software related disk failure. In the prior art, this is done by power-cycling all the disks which are connected to the controller connected failing disk controller (e.g. HBA). This solution is inefficient in cases where the same controller is connected to a large number of disks, as all disks become unavailable throughout the power-cycle process.

This problem becomes critical in storage systems which are configured in accordance with Serial Attached SCSI (SAS) protocol. SAS is a technology for data transfer between computer network storage devices, such as hard drives and tape drives, which is based on a point-to-point serial protocol and replaces parallel SCSI bus technology. An SAS domain is an input/output (I/O) system that includes a network of devices that communicate with one another in accordance with SAS protocol. In an SAS domain one or more initiators (e.g. HBAs) can be each connected with a plurality of targets. An initiator is a device that can initiate SCSI commands and receive responses, and a target is an end device such as a disk drive, which can receive and handle SCSI commands. One major advantage of SAS technology over previous technologies, such as parallel SCSI, is that it enables a single SAS domain to contain over 16,000 SCSI targets. Accordingly, a single initiator can be connected to a cloud of targets. This can be accomplished, inter alia, with the help of (SAS) expanders, which act as switches between SAS initiators and SAS targets and are capable of connecting a host to multiple SAS end devices.

Thus, in a storage-system configured with SAS technology, when a single initiator (e.g. HBA) undergoes a power-cycle, many disk drives can be power-cycled simultaneously and become unavailable throughout the power-cycle process.

Furthermore, although a power-cycle is a process which generally lapses about 5-15 seconds for each disk, in cases where multiple disks are being concurrently power-cycled, the process is terminated only when power-cycle of all disks is completed. Therefore the entire process can take a much longer time, during which all disks are unavailable.

In view of the above it would be advantageous to enable automatic power-cycling of individual failing disks. According to the presently disclosed subject matter there is provided, inter alia, a system and method which, responsive to the identification of malfunctioning disks in a storage system, activates a power-cycle process only for the specific failing disks, in order to bring these disks into proper operational mode. During the power-cycle process of a failing disk, other disks which are not failing remain operative and available.

Turning now to FIG. 1, which shows a functional block diagram schematically illustrating an example of a storage-system architecture, according to the presently disclosed subject matter. FIG. 1 shows one or more host computers $101_{1-n}$ (workstations, application servers, etc.) illustrated as sharing common storage means provided by a virtualized storage system 102. A host ($101_{1-n}$) can be for example an external server, a group of servers, a port in server, a laptop or personal computer etc.

The storage system comprises a storage control layer 103 comprising one or more appropriate storage control devices operatively coupled to the plurality of host computers $101_{1-n}$ and to a plurality of data storage devices $104_{1-n}$ constituting a physical storage space optionally distributed over one or more storage nodes, wherein the storage control layer 103 is operable to control and input/output (I/O) operations between hosts $101_{1-n}$ and data storage devices $104_{1-n}$. Connection between host computers $101_{1-n}$ and storage system 102 can be a direct connection and/or it may be established over a communication network. Data storage devices $104_{1-n}$ are adapted for storing a plurality of data units. Control layer 103 can comprise or be otherwise associated with one or more controlling units (HBAs) which are directly associated with the data storage devices $104_{1-n}$ or disk located therein and facilitate communication between control layer and data storage devices $104_{1-n}$. Control layer 103 can also comprise or be otherwise associated with one or more processors configured, inter alia, to manage and control relevant components and operations, and to perform tasks in response to instructions.

The storage control layer 103 is further operable to handle a virtual representation of physical storage space and to facilitate necessary mapping between the physical storage space and its virtual representation (i.e. a logical storage space). Control layer 103 is configured to create and manage at least one virtualization layer interfacing between elements of the computer system (host computers, etc.) external to the storage system and the physical storage space.

The virtualization functions may be provided in hardware, software, firmware or any suitable combination thereof. Optionally, the functions of control layer 103 (including the functions of disk performance monitor 109) may be fully or partly integrated with one or more host computers and/or storage devices and/or with one or more communication devices enabling communication between the hosts and the storage devices. Optionally, a format of logical representation provided by control layer 103 may differ, depending on interfacing applications.

The physical storage space may comprise any appropriate permanent storage medium and may include, by way of non-limiting example, one or more disk units (DUs), also called "disk enclosures", comprising several disk drives (disks). The physical storage space comprises a plurality of data blocks, each data block may be characterized by a pair ($DD_{id}$, DBA) where $DD_{id}$ is a serial number associated with the disk drive accommodating the data block, and DBA is a logical block number within the respective disk. By way of non-limiting example, $DD_{id}$ may represent a serial number internally assigned to the disk drive by the system or, alternatively, a WWN or universal serial number assigned to the disk drive by a vendor or manufacturer. The storage control layer 103 and storage devices $104_{1-n}$ may communicate with host computers $101_{1-n}$ and within the storage system in accordance with any appropriate storage protocol.

Data stored in the physical storage space, may be logically represented to a client (host) in terms of logical objects within a logical storage space. Depending on the storage protocol, the logical objects may be logical volumes, data files, multi-media files, snapshots and other copies, etc.

The entire address space of the storage system is divided into logical volumes, and each logical volume becomes an addressable device. A logical volume (LV) or logical unit (LU) represents a plurality of data blocks characterized by successive Logical Block Addresses (LBA) ranging from 0 to a number LUK. Different logical volumes may comprise different numbers of data blocks, which are typically of equal size within a given system (e.g. 512 bytes).

Blocks with successive LBAs can be grouped into portions that act as basic units for data handling and organization within the system. Thus, by way of non-limiting instance, whenever space has to be allocated on a disk drive or on a memory component in order to store data, this allocation can be done in terms of data portions. Data portions are typically, although not necessarily, of equal size throughout the system (by way of non-limiting example, the size of data portion can be 64 Kbytes).

Storage control layer 103 can be further configured to facilitate various protection schemes. By way of non-limiting example, data storage formats, such as Redundant Array of Independent Disks (RAID), can be employed to protect data from internal component failures by making copies of data and rebuilding lost or damaged data. As the likelihood for two concurrent failures increases with the growth of disk array sizes and increasing disk densities, data protection can be implemented, by way of non-limiting example, with the RAID 6 data protection scheme well known in the art.

Common to all RAID 6 protection schemes is the use of two parity portions per several data portions (e.g. using groups of four data portions plus two parity portions in a (4+2) protection scheme), the two parities being typically although not necessarily calculated by two different methods. Under one known approach, all N consecutive data portions are gathered to form a RAID group, to which two parity portions are associated. The members of a group (including the data portions and the parity portions) are typically although not necessarily stored in separate drives. Under a second known approach, protection groups can be arranged as two-dimensional arrays, typically although not necessarily N*N such that data portions in any given line or column of the array are stored in separate disk drives. In addition, to every row and to every column of the array a parity portion can be associated. These parity portions are stored in such a way that the parity portion associated with a given column or row in the array resides in a disk drive where no other data portion of the same column or row also resides. Under both approaches, whenever data is written to a data portion in a group, the parity portions are also updated (e.g. using techniques based on XOR or Reed-Solomon algorithms). Whenever a data portion in a group becomes unavailable (e.g. because of disk drive general malfunction, or because of a local problem affecting the portion alone, or for any other reason), the data can still be recovered with the help of one parity portion via appropriate known in the art techniques. Then, if a second malfunction causes data unavailability in the same drive before the first problem was repaired, data can nevertheless be recovered using the second parity portion and appropriate known in the art techniques.

The storage control layer can further comprise a cache memory 105 operable as part of the IO flow in the system, a cache control module (aka cache manager) 106, that regulates data activity in the cache, an allocation module 107 and an IO management module 108 for receiving and handling command (including IO commands) and enabling execution of the respective operations. The elements within control layer 103 can be implemented as centralized modules operatively connected to the plurality of storage control devices or can be distributed over a part or all storage control devices.

In accordance with the presently disclosed subject matter, control layer 103 can further comprise a disk performance monitor 109. Disk performance monitor 109 is configured inter alia, to detect one or more malfunctioning disks, determine whether a disk power-cycle is warranted and in case it is, execute a power-cycle process only on the one or more malfunctioning disks.

According to the presently disclosed subject matter, storage system 102 can be configured in accordance with SAS technology. To this end storage system 102 can comprise appropriate hardware and be made operable in accordance with the SAS protocol. Control device 103 comprises one or more host bus adaptors (HBA), where each HBA operates as a SAS initiator. Depending on the scalability of storage system 102 and the number of storage devices $104_{1-n}$, control layer 103 can comprise different numbers of HBAs.

In general, a single HBA can connect via a plurality of ports to a plurality of end devices (i.e. targets) including for example, storage devices $104_{1-n}$. According to the presently disclosed subject matter, storage devices $104_{1-n}$ schematically illustrate storage devices of any size or form. For example, any one of storage devices $104_{1-n}$ can represent a single disk drive (disk), a disk enclosure comprising a plurality of disks (e.g. where each disk is indirectly connected to an HBA e.g. via a cascade of one or more expanders), or a rack comprising a plurality of enclosures.

Certain embodiments of the presently disclosed subject matter are applicable to the storage architecture of a computer system described with reference to FIG. 1. However, the invention is not bound by the specific architecture; equivalent and/or modified functionality can be consolidated or divided in another manner and can be implemented in any appropriate combination of software, firmware and hardware. Those versed in the art will readily appreciate that the invention is, likewise, applicable to storage architecture implemented as a virtualized storage system. In different embodiments of the presently disclosed subject matter the functional blocks and/or parts thereof can be placed in a single or in multiple geographical locations (including duplication for high-availability); operative connections between the blocks and/or within the blocks can be implemented directly (e.g. via a bus) or indirectly, including remote connection. The remote connection can be provided via Wire-line, Wireless, cable, Internet, Intranet, power, satellite or other networks and/or using any appropriate communication standard, system and/or protocol and variants or evolution thereof (as, by way of unlimited example, Ethernet, iSCSI, Fiber Channel, etc.).

FIG. 2 is a functional block diagram schematically illustrating an example of disk performance monitor 109 according to the presently disclosed subject matter. Disk performance monitor 109 comprises a disk fault monitoring unit 203, disk fault analyzer 205, disk power-cycle unit 207 and disk power-cycle data-repository 209.

Disk fault monitor 203 is configured to receive disk fault information, which includes data indicative of malfunctioning disks among storage devices $104_{1-n}$ within storage system 102. This information can be received by disk fault monitor 203 for example, from one or more controllers or initiators (e.g. HBA), which are directly connected to the disks or disk units and control and monitor the operation of the disk in the storage system.

In some cases, disk fault information received by disk fault monitor 203, is forwarded to disk fault analyzer 205. Disk fault analyzer 205 is configured to analyze the information and estimate whether disk power-cycle is an effective measure for repairing the failing disk.

In case disk fault analyzer 205 estimates that the malfunctioning disk is likely to be repaired by a power-cycling the disk, it can notify disk power-cycle unit 207. Disk power-cycle unit 207 is configured to execute a power-cycle process. To this end disk power-cycle unit 207 comprises a power-cycle data update module 220 and a disk power-cycle module 222.

Power-cycle data update module 220 is configured to update disk power-cycle data repository 209 with information indicating that a certain disk is undergoing a disk power-cycle process (i.e. the disk is in "power-cycle mode") and therefore the malfunction disk is not available. Power-cycle data repository 209 can be implemented for example as data-structure (e.g. a table of some sort) in a computer memory dedicated for storing information in respect of disks which are in power-cycle mode. Power-cycle data repository 209 can be integrated as part of disk performance monitor 109 or it may be located outside of disk performance monitor and be operatively associated with it.

The information stored in disk power-cycle data repository 209, is useful in case a command is received in respect of a disk while in power-cycle mode and thus unavailable. As explained in more detail below, control layer 103 is configured to handle, with the help of the information stored in disk power-cycle data repository 209, different types of commands which are received in respect of a disk which is in power-cycle mode.

Disk power-cycle module 222 is configured to power-cycle the disk i.e. to turn the disk off and turn it back on again. Once the disk is turned on and is operating again, power-cycle data update module 220 can update disk power-cycle data repository 209 to indicate that a disk which has been power-cycled is now available and can be accessed.

Disk power-cycle module 222 is operable to communicate with disk slots (or bays) in storage system 102 using SCSI Enclosure Service (SES). SES is a set of enclosure control commands which enables, inter alia, to access enclosure and disk slots in the enclosures within storage devices $104_{1-n}$. Disks drives are connected to disk slots within disk enclosures. A disk slot is a position in an enclosure into which a disk may be inserted. The position provides appropriate power, signal, and control connections to the SCSI device.

According to the presently disclosed subject matter, disk power-cycle module 222, is configured to utilize the SES commands in order to execute a disk power-cycle process. According to the SAS protocol a device slot can be managed with the help of an SES command which is directed to a given enclosure and includes a predefined data element named "device slot control element". The SES device slot control element contains a "DEVICE OFF" bit enabling to control the operation of a device located within the targeted enclosure. In case a DEVICE OFF bit is set to one the device is turned off. In case a DEVICE OFF bit is set to zero the device can be turned on. The SES command is directed to an enclosure and includes information (e.g. device target number) which enables to direct the command to the disk slot of interest. By controlling the device i.e. the disk slot, the corresponding disk, which is attached to the disk slot, can also be controlled. Accordingly, the device slot control element enables to turn off and turn on a specific disk in storage system 102.

Disk power-cycle module 222 is configured, responsive to a command (received for example from disk fault analyzer 205), to send to an enclosure of a malfunctioning disk, a device slot control element with DEVICE OFF bit set to 1, which is directed to a respective disk slot of the malfunctioning disk and thereby turns off the device (i.e. the disk slot) as well as the corresponding disk. Disk power-cycle module 222 is further configured, after turning the disk off, to send to the enclosure of the malfunctioning disk, a device slot control element with DEVICE OFF bit set to 0, which is again directed to a the respective disk slot and thereby turns the device (i.e. the disk slot) and the corresponding disk back on again. In some cases disk power-cycle module 222 can be configured to wait for a predefined time interval (e.g. a few seconds) from the time the disk is turned off, before turning the disk on again. Information identifying the enclosure and disk slot holding the malfunctioning disk, which can be used for directing the control command to its destination is available to control layer 103, for example in the disk fault information indicative of the malfunctioning disk.

A complete specification of the slot control element is described on pages 70-72 of American National Standard Working Draft Project T10/2149-D, Revision 01, Jul. 22, 2009 which is incorporated herein by reference. FIG. 5 illustrates the device slot control element. Note that the "DEVICE OFF" is the $5^{th}$ bit in the $4^{th}$ byte of the control element. A more detailed description of the operations performed by disk performance monitor 109 is disclosed below with reference to FIGS. 3 and 4.

Proceeding now to FIG. 3, this illustrates a flowchart showing an example of operations carried out, in accordance with the presently disclosed subject matter. The operations specified with reference to FIG. 3 can be performed by disk performance monitor 109.

At block 301 fault information indicative of errors occurring in one or more disks located in the storage system is received. The received information is analyzed (e.g. with the help of disk fault analyzer 205), and it is estimated whether the failing disk can be repaired by a power-cycle (block 305). In case the received disk fault information includes information in respect of errors which occurred in multiple disks, the errors from each disk are analyzed separately in order to obtain specific information in respect of each individual disk.

In order to facilitate the above analysis, disk fault information can include data which enabled to estimate the cause of the detected errors. For instance, disk fault information can include the number and frequency of errors, the location of the error within the respective disk, and the type of the command which is associated with the error (e.g. read, write), etc.

For example, in case multiple write errors are identified in a specific area on the disk, while other areas on the disk do not exhibit similar events, it is more likely that such errors are the result of media failure which cannot be repaired by a power-cycle. On the other hand in case multiple errors of different types (e.g. failure to execute read, write and other types of control commands) occur randomly at different locations on the disk, this may indicate that the errors result from general failure of executing protocol commands and this type of error can often be repaired by a power-cycle. Also, in case the disk respond incorrectly to commands (e.g. retrieves incorrect data from disk) it is more likely that a media error occurred, while in case the disk does not respond to commands it is more likely that a protocol failure occurred.

In case it is estimated that a malfunctioning disk cannot be repaired by disk power-cycle, other disk repair and/or data integrity measures such as different types of error correction codes and schemes can be executed (block 307).

In case it is estimated that a malfunctioning disk can be repaired by a disk recycle, a disk recycle process is automatically executed. At block 305, disk power-cycle data repository 209 is updated with information in respect of a disk which is entering power-cycle mode. In some cases instead of creating a designated table (or any other data structure) for storing information in respect of disks which are in power-cycle mode, this information can be added to an allocation table (which is managed by allocation module 107) used for recording the allocation of logical data within the physical storage space, and provides detailed information about the various logical volumes in the system. As explained below, the information in disk power-cycle data repository 209 can be used in case an IO or control command is received and it is essential to validate whether the accessed disk is in power-cycle mode and therefore unavailable.

At block 309 the disk is turned off. As explained above, a disk can be turned off by sending a control command to the enclosure of the disk, the control command directed to the respective disk slot, comprising a device slot control element with a DEVICE OFF bit set to 1. After sending a command intended to turn off the disk slot along with the corresponding disk, it can be validated that the command was executed and the disk is indeed turned off. This can be accomplished for example with the help of disk power-cycle module 222 which can be configured to check whether there is power in the respective disk slot and/or corresponding disk.

At block 311 the disk is turned on and becomes accessible again. In a similar manner this is accomplished by sending a control command to the enclosure of the disk, the control command directed to the respective disk slot and comprising a device slot control element with a DEVICE OFF bit set to 0. After a command intended to turn on the disk slot along with the corresponding disk is sent, it can be validated that the command was executed and the disk is indeed turned on. As before, this can be accomplished for example, with the help of disk power-cycle module 222 which can be configured to check whether there is power in the respective disk slot and/or corresponding disk. Disk power-cycle data repository 209 is updated to indicate that the disk is now available (block 313).

Once the disk power-cycle process is completed, the operation of the disk can be examined in order to determine whether the disk is operating properly. This can be accomplished in many different ways, for example by sending trial IO requests to random places in the disk. These may include, for instance:

reading certain random blocks from the disk;
maintaining the retrieved data in memory;
writing the retrieved data again to the same place on the disk;
reading the same blocks again from the disk and comparing the read data with the data in memory. This procedure can be repeated multiple times in different locations on the disk.

In case it is determined that the disk is still malfunctioning, it may be that the disk cannot be fixed by a disk power-cycle and the process continues to block 307 to execute other disk repair and data integrity measures.

In some case, if it is determined that the disk is still malfunctioning disk power-cycle process can be repeated one or more times before it is determined that the disk cannot be repaired by a disk power-cycle process.

As mentioned above, a disk in a power-cycle mode is unavailable and cannot be accessed. According to the presently disclosed subject matter, control layer 103 is configured to identify that a received IO command or a control command is directed to a disk which is in power-cycle mode and handles the command accordingly.

Some control commands are directed to obtain data in respect of the disk and not in respect of the data which is stored on the disk. Such commands include for example, "unit attention" SCSI Request Sense command (03H), which is used to obtain sense data (error information) from a target device; SCSI Receive Diagnostic Results command (1CH) is used to interrogate the results of a self-test. In order to complete this type of command, the disk must be available.

Therefore, in case a command of this type is received, disk performance monitor 209 in control layer 103 is configured to determine whether the relevant disk is in power-cycle mode. In case it is, this information can be made available to IO management module 108, which handles incoming commands. In response IO management module 108 is configured to delay the execution of the command for a predefined period of time (e.g. a predetermined number of seconds or minutes). After the predefined period of time elapses disk performance monitor 109 can be configured to check again whether the disk is available, and execute the command in case it is, and repeat the process in case it is not.

As mentioned above, storage system can be configured to facilitate various protection schemes, such as RAID in order to protect data from internal failures. Some RAID schemes implement mirroring, where identical data is written to multiple disks to provide backup in case one disk fails. Other RAID schemes, such as RAID 5 and RAID 6, implement distributed parity which enables to reconstruct the data in case of one or two disk failures.

Accordingly, in case a read command is received disk performance monitor 209 in control layer 103 is configured to determine whether the relevant disk is in power-cycle mode. In case it is, this information can be made available to IO management module 108, which handles the incoming commands, and in response IO management module 108 is configured to utilize RAID's redundant data or parity in order to obtain the requested data and complete the read command without delay.

Typically although not necessarily, definition of LUs and/or other objects in the storage system can involve in-advance configuring an allocation scheme and/or allocation function used to determine the location of the various data portions and their associated parity portions across the physical storage medium. Sometimes, (e.g. in some cases of thin volumes or snapshots) the allocation is only performed when, for the first time after definition of the volume, a write command is directed at a certain block or data portion in it.

According to the first allocation technique (named write-in-place) when data is modified, it is written back to its original physical location on the disk drive, overwriting the older data. In contrast, according to the latter allocation technique (named write-out-of-place technique in log form, also known as log-write) a modified data block is written to a new physical location in the storage space (e.g. on a different disk drive). Thus, when data is modified after being read to memory from a location on a disk drive, the modified data is written to a new physical location so that the previous, unmodified version of the data is retained, but the reference to it is typically deleted, the storage space at that location therefore becoming free for reuse. A non-limiting example of the write-out-of-place technique is the known write-anywhere technique, enabling writing data blocks to any available disk drive without prior allocation.

More information in respect of log-write and data allocation techniques is disclosed in U.S. patent application Ser. No. 13/173,941 filed on Jun. 30, 2011, assigned to the assignee of the present application and incorporated herein by reference in its entirety.

According to the presently disclosed subject matter, storage system 102 can be configured to support log-write techniques in order to execute a write command which is received in respect of a disk which is in power-cycle mode. Turning now to FIG. 4 which is a flowchart showing operations carried out, in accordance with the presently disclosed subject matter. FIG. 4 shows an example of a sequence of operations which are executed in case a received write command is directed to a disk which is in power-cycle mode.

At block 401 a write command is received. A write command can be received for example from one of host computers 101$_{1-n}$. A write command is received in control 103 and can be processed with the help of IO management module 108 and allocation module 107. At block 403 one or more disks are allocated for writing the received data. To this end allocation module 107 is configured for allocating a physical location within the storage space for writing the data which is received in the write command. For example, in case storage system 102 is configured with RAID and a full RAID group is being destaged to the physical storage space, a plurality of disks are selected for writing the different members of a RAID group (including the data portions and the parity portions) which are typically although not necessarily stored in separate drives.

Once the disks are allocated power-cycle, data repository 209 is queried in order to determine whether any one of the allocated disks is in power-cycle mode or not (block 405). For example allocation module 107 can be configured to utilize disk performance monitor 109 to query disk power-cycle data repository 209 and determine the status of the disks which were allocated for writing the members of the RAID group.

In case it is determined that none of the (one or more) allocated disks is in power-cycle mode and are available for writing, the data can be written to the allocated disks (block 411). Where applicable, once data is written, parity is calculated based on the newly written data (block 409).

As log-write technique is implemented by storage system 102, the received data is not bound to any specific disk within the storage system. Accordingly, in case it is determined that at least one of the one or more allocated disks is in power-cycle mode and is therefore unavailable for writing, data can be written to alternative disk in storage system 102. At block 407 one or more alternative disks are selected (e.g. with the help of allocation module 107). The operations in block 405 are repeated in order to determine whether all newly selected disks are available.

At block 409 a parity value (in case it is needed) is calculated with the new updates. At block 411 the data is written to the respective disks. The writing process as disclosed herein with reference to FIG. 4 enables to write data to a disk, even if one or more of the originally allocated disks are in power-cycle mode. This enables to write the data without delay in a protected manner which enables to ensure data integrity by calculating a new parity based on the updated data.

In other cases where mirroring is used, the write-log technique enables to write without delay two copies of the newly received data in a protected manner which enables to ensure data integrity.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter.

The invention claimed is:

1. A method of automatic disk power-cycle, for use in a storage system comprising one or more disk enclosures comprising a plurality of disks located in respective disk slots in said enclosures, said enclosures being adapted to be controlled by enclosure control commands, the method comprising:

receiving disk fault information indicative of errors occurring in a certain disk of the plurality of disks;

estimating, based on the disk fault information, whether or not the certain disk undergoes a media failure;

if it is estimated that the certain disk does not undergo the media failure, activating a power cycling for the certain disk, by sending to a disk enclosure, containing a disk slot corresponding to the certain disk, a first request to turn off the disk slot, and sending to the disk enclosure, a second request to turn on the disk slot; and in response to a write command for writing modified data, directed to the certain disk while being power-cycled, writing the modified data to an alternative disk in the storage system, in accordance with a log-write technique.

2. The method according to claim 1 further comprising:
analyzing said disk fault information and estimating whether the certain disk is likely to be repaired by the power cycling, and activating the power cycling, if it is estimated that the power cycling is an effective measure for repairing the certain disk.

3. The method according to claim 1 further comprising delaying the sending of said second request to turn on the disk slot, for a predefined period of time from the time of sending said first request to turn off the disk slot.

4. The method according to claim 1 further comprising:
after sending to the disk slot said first request to turn off the disk slot, validating that the disk slot and the certain disk are turned off.

5. The method according to claim 1 further comprising:
after sending to the disk slot said second request to turn the certain disk on, validating that the disk slot and the certain disk are turned on.

6. The method according to claim 1 further comprising:
after turning the disk slot and the certain disk on, checking whether the certain disk is operating properly.

7. The method according to claim 6 further comprising: in case where the certain disk is not operating properly, repeating activation of the power cycling for the certain disk.

8. The method according to claim 1 further comprising:
in response to a control command designated to a disk in said storage system, determining whether the disk is in a power-cycle mode; and
in case it is, delaying execution of the control command for a predefined period of time.

9. The method according to claim 1, wherein said storage system is configured with Redundant Array of Independent Disks (RAID) with parity, wherein the method further comprising:
responsive to a read command designated to a disk in said storage system and for receiving requested data,
determining whether the disk is in power-cycle mode; and
in case it is, use parity or mirroring for obtaining the requested data, thereby providing the requested data without delay.

10. The method according to claim 1, wherein said storage system is configured in accordance with a log-write technique, the method further comprising:
responsive to a write command, allocating one or more disks for writing data in said write command;
determining whether any one of said one or more disks is in power-cycle mode;
in case it is, allocating one or more alternative disks; and
writing data to one or more allocated disks.

11. The method according to claim 10, wherein said storage system is configured with Redundant Array of Independent Disks (RAID) with parity, further comprising:

calculating parity based on the received data and writing parity to a respective disk.

12. The method according to claim 1 wherein said storage system is configured to operate in accordance with a Serial Attached SCSI (SAS) and SAS Enclosure Service (SES).

13. The method according to claim 12 wherein said first request to turn off the disk slot is a first SES command that includes a device slot control element that contains a DEVICE OFF bit set to 1 in order to turn off said disk slot and wherein said second request to turn on the disk slot is a second SES command that includes a device slot control element that contains a DEVICE OFF bit set to 0 in order to turn on said disk slot.

14. The method of claim 1, wherein the disk fault information comprises locations of the errors within the certain disk; wherein the method comprises estimating that the certain disk undergoes a media failure and avoiding activating power cycling, in cases where the locations of the errors are limited to a specific area on the certain disk.

15. The method of claim 1, wherein the disk fault information comprises at least one of: locations of the errors within the certain disk and types of commands associated with the errors; wherein the method comprises estimating that the certain disk does not undergo a media failure, in cases where the errors fulfil at least one condition of: (i) the errors are associated with different types of commands; and (ii) the locations of the errors are randomly spread over different locations on the certain disk.

16. A storage system comprising one or more disk enclosures controlled by one or more storage control devices, the one or more storage control devices constituting a storage control layer, said storage control layer operatively coupled to the one or more disk enclosures, said one or more disk enclosures comprising a plurality of disks located in respective disk slots in said enclosures; said enclosures being adapted to be controlled by said control layer in accordance with enclosure control commands,
said storage control layer is configured to:
receive disk fault information indicative of errors occurring in a certain disk of the plurality of disks;
estimate, based on the disk fault information, whether or not the certain disk undergoes a media failure;
if it is estimated that the certain disk does not undergo a media failure, to activate power cycling for the certain disk, by sending to a disk enclosure containing a disk slot corresponding to the certain disk, a first request to turn off the disk slot and a second request to turn on the disk slot; and in response to a write command for writing modified data, directed to the certain disk while being power-cycled, said control layer is configured to write the modified data to an alternative disk in the storage system, in accordance with a log-write technique.

17. The storage system according to claim 16, wherein said control layer is further configured to analyze the disk fault information being indicative of errors occurring in the certain disk, to estimate whether the certain disk is likely to be repaired by a disk power-cycle; and to activate the power cycling, if it is estimated that the power cycling is an effective measure for repairing the certain disk.

18. The storage system according to claim 16, wherein said control layer is further configured to delay the sending of said second request to turn on the disk slot, for a predefined period of time, from the time of sending said first request to turn off the disk slot.

19. The storage system according to claim 16, wherein said control layer is further configured to validate that the disk slot and the certain disk are turned off, after the first request to turn off the disk slot is sent.

20. The storage system according to claim 16, wherein said control layer is further configured to validate that the disk slot and the certain disk are turned on, after the second request to turn the disk slot on is sent.

21. The storage system according to claim 16, wherein said control layer is further configured to validate that the certain disk is operating properly after the disk slot and the certain disk are turned on.

22. The storage system according to claim 16, wherein said control layer is further configured, responsive to a control command designated to a disk in said storage system, to determine whether the disk is in a power-cycle mode; and in case it is, delay execution of the control command for a predefined period of time.

23. The storage system according to claim 16, wherein said storage system is configured with Redundant Array of Independent Disks (RAID) with parity and wherein said control layer is further configured, in response to a read command designated to a disk in said storage system for requested data, to determine whether the disk is in power-cycle mode; and in case it is, use parity or mirroring for obtaining the requested data, thereby provide the requested data without delay.

24. The storage system according to claim 16 wherein said storage system is configured in accordance with a log-write technique and wherein said control layer is further configured, in response to a write command, to allocate one or more disks for writing data in said write command; determine whether any one of said one or more disks is in power-cycle mode; in case it is, allocate one or more alternative disks; and write data to the one or more allocated disks.

25. The storage system according to claim 24, wherein said storage system is configured with Redundant Array of Independent Disks (RAID) with parity, the control layer is further configured to calculate parity based on the received data and writing parity to a respective disk.

26. The storage system according to claim 16, wherein said control layer is associated with a data-repository configured for storing data in respect of availability of said certain disk.

27. The storage system according to claim 16 wherein said storage system is configured to operate in accordance with a Serial Attached SCSI (SAS) and SAS Enclosure Service (SES).

28. The storage system according to claim 27 wherein said first request to turn off the disk slot is a first SES command that includes a device slot control element that contains a DEVICE OFF bit set to 1 in order to turn off said disk slot and wherein said second request to turn on the disk slot is a second SES command that includes a device slot control element contains a DEVICE OFF bit set to 0 in order to turn on said disk slot.

29. The storage system of claim 16, wherein the disk fault information comprises locations of the errors within the certain disk; wherein the storage control layer is configured to estimate that the certain disk undergoes a media failure and to avoid activating power cycling, in cases where the locations of the errors are limited to a specific area on the certain disk.

30. The storage system of claim 16, wherein the disk fault information comprises at least one of: locations of the errors within the certain disk and types of commands associated with the errors; wherein the storage control layer is configured to estimate that the certain disk does not undergo a media failure, in cases where the errors fulfil at least one condition of: (i) the errors are associated with different types of commands; and (ii) the locations of the errors are randomly spread over different locations on the certain disk.

31. A disk performance monitor, operatively connectible to a storage system comprising one or more disk enclosures controlled by a plurality of storage control devices, the storage control devices constituting a storage control layer, said storage control layer operatively coupled to the one or more disk enclosures; said one or more disk enclosures comprising a plurality of disks located in respective disk slots in said enclosures; said enclosures being adapted to be controlled by said control layer in accordance with enclosure control commands, said disk performance monitor is configured to:
        receive disk fault information indicative of errors occurring in a certain disk of the plurality of disks;
        estimate, based on the disk fault information, whether or not the certain disk undergoes a media failure;
        if it is estimated that the certain disk does not undergo the media failure, to generate data indicative that said certain disk is temporarily unavailable; to activate power cycling for the certain disk, by sending to a disk enclosure containing a disk slot corresponding to the certain disk, a first request to turn off the disk slot and a second request to turn on the disk slot; and to generate data indicative that said certain disk is available; and
        in response to a write command for writing modified data, directed to the certain disk while being power-cycled and therefore indicated as unavailable, to enable the control layer to write the modified data to an alternative disk that is indicated as available.

32. A program storage device readable by a machine, tangibly embodying a program of instructions that when executed by the machine causing the machine to perform method steps of a method of automatic disk power-cycle, for use in a storage system comprising one or more disk enclosures comprising a plurality of disks located in respective disk slots in said enclosures, said enclosures being adapted to be controlled in accordance with enclosure control commands, the method comprising:

receiving disk fault information indicative of errors occurring in a certain disk of the plurality of disks;
    estimating, based on the disk fault information, whether or not the certain disk undergoes a media failure;
    if it is estimated that the certain disk does not undergo a media failure, activating power cycling for the certain disk, by sending to a disk enclosure containing a disk slot corresponding to the certain disk, a first request to turn off the disk slot, and sending to the disk enclosure, a second request to turn on the disk slot; and
    in response to a write command for writing modified data, directed to the certain disk while being power-cycled, writing the modified data to an alternative disk in the storage system.

\* \* \* \* \*